(12) United States Patent
Ishizaki

(10) Patent No.: US 7,514,175 B2
(45) Date of Patent: Apr. 7, 2009

(54) ANODE CAN FOR BATTERY AND MANUFACTURING METHOD THEREOF

(75) Inventor: Morio Ishizaki, Itami (JP)

(73) Assignee: Ishizaki Press Kogyo Co., Ltd., Hyogo (JP)

( * ) Notice: Subject to any disclaimer, the term of this patent is extended or adjusted under 35 U.S.C. 154(b) by 682 days.

(21) Appl. No.: 10/765,933

(22) Filed: Jan. 29, 2004

(65) Prior Publication Data

US 2004/0185337 A1 Sep. 23, 2004

(30) Foreign Application Priority Data

Feb. 4, 2003 (JP) ............................. 2003-027054

(51) Int. Cl.
- *H01M 2/04* (2006.01)
- *B21C 37/30* (2006.01)
- *H01M 2/02* (2006.01)
- *B21D 17/02* (2006.01)

(52) U.S. Cl. .................. 429/176; 429/164; 72/370.14; 72/370.01

(58) Field of Classification Search ............... 72/370.14
See application file for complete search history.

(56) References Cited

U.S. PATENT DOCUMENTS 3,577,753 A * 5/1971 Shah et al. ................... 72/41
4,534,199 A * 8/1985 Takaishi et al. ............. 72/276
6,258,480 B1 * 7/2001 Moriwaki et al. .......... 429/176
6,333,124 B1 12/2001 Moriwaki et al.
2002/0043089 A1 * 4/2002 Reiche et al. ................ 72/283

FOREIGN PATENT DOCUMENTS

| CN | 1236491 A | 11/1999 |
|---|---|---|
| JP | 05-089861 | 4/1993 |
| JP | P2000-315495 A | 11/2000 |
| KR | 2000-0068921 | 11/2000 |
| KR | 2000-0069844 | 11/2000 |
| KR | 2002-0080441 | 10/2002 |

* cited by examiner

Primary Examiner—Patrick Ryan
Assistant Examiner—Keith Walker
(74) Attorney, Agent, or Firm—McDermott Will & Emery LLP

(57) ABSTRACT

A cylindrical anode can has a sidewall extending along a central axis. The sidewall has an upper end portion having a relatively large thickness and a sidewall small portion having a thickness smaller than the upper end portion. The upper end portion is located at an end of the sidewall, and the sidewall small portion is a portion other than the upper end portion. In the sidewall, a distance (L3) between an outer circumferential surface of the upper end portion and the central axis is equal to a distance (L3) between an outer circumferential surface of the sidewall small portion and the central axis. A distance (L1) between an inner circumferential surface of the upper end portion and the central axis is smaller than the distance (L2) between an inner circumferential surface of the sidewall small portion and the central axis.

4 Claims, 11 Drawing Sheets

ANODE CAN FOR BATTERY AND MANUFACTURING METHOD THEREOF

BACKGROUND OF THE INVENTION

1. Field of the Invention

The present invention relates to an anode can of a battery and a manufacturing method thereof, and more particularly to an anode can having a sufficient strength at a junction between the anode can and a cathode cover and a manufacturing method thereof.

2. Description of the Background Art

Conventionally, a battery in which a battery cell is accommodated in an anode can and one opening of the anode can is sealed with a cathode cover has been known (see Japanese Patent Laying-Open No. 2000-315495, for example).

The conventional anode can, however, has suffered from the following problems. In order to increase a capacity of a battery while maintaining its outer dimension, a sidewall of the anode can preferably has a thickness as small as possible. On the other hand, if the thickness of the sidewall is too small, a strength of a fixing portion for fixing the cathode cover, formed by deforming an end portion of the anode can so as to clamp an end of the cathode cover, is lowered.

SUMMARY OF THE INVENTION

An object of the present invention is to provide an anode can having a sufficient strength in a fixing portion of the anode can and a cathode cover of a battery as well as a manufacturing method thereof.

An anode can for a battery according to the present invention is a cylindrical anode can for a battery having a sidewall and extending along a central axis. The sidewall has a large thickness portion having a relatively large thickness and a small thickness portion having a thickness relatively smaller than that of the large thickness portion. The large thickness portion is positioned at an end portion of the sidewall, and the small thickness portion refers to a portion other than the large thickness portion in the sidewall. In the sidewall, a distance between an outer circumferential surface of the large thickness portion and the central axis is equal to a distance between an outer circumferential surface of the small thickness portion and the central axis. On the other hand, in the sidewall, a distance between an inner circumferential surface of the large thickness portion and the central axis is smaller than a distance between an inner circumferential surface of the small thickness portion and the central axis.

In this manner, when the anode can and the cathode cover are connected and fixed to each other by deforming an end portion of the sidewall of the anode can so as to clamp an end of the cathode cover, strength of a junction between the anode can and the cathode cover can sufficiently be increased, because the thickness of the end portion of the sidewall (the large thickness portion) of the anode can forming the junction is relatively made larger.

In addition, as to the outer circumferential surface of the sidewall, the distance between the outer circumferential surface of the large thickness portion and the central axis is equal to the distance between the outer circumferential surface of the small thickness portion and the central axis. Therefore, projection of the junction between the anode can and the cathode cover (a portion formed by the large thickness portion) beyond the small thickness portion of the sidewall of the anode can (the portion other than the large thickness portion) can be suppressed. Accordingly, in a battery in conformity with the battery specifications defined in terms of outer size, an outer dimension of the sidewall of the anode can serving as a portion accommodating a battery cell (a portion where the small thickness portion of the sidewall is provided) can be made as large as an outer dimension of a battery determined based on the battery specifications. In this manner, a volume of the battery cell can be made larger, and the capacity of the battery can also be increased.

In the anode can for a battery described above, in the sidewall, an inner circumferential surface of a boundary portion between the large thickness portion and the small thickness portion may be inclined toward the inner circumferential surface of the sidewall in the small thickness portion.

In such a case, the inner circumferential surface of the large thickness portion and the inner circumferential surface of the small thickness portion can be connected with a smooth surface (the inner circumferential surface of the boundary portion). That is, an angular portion with a sharp angle or the like is not formed in the boundary portion between the large thickness portion and the small thickness portion. Therefore, when the anode can is subjected to working in a manufacturing process of a battery, a possibility that a stress concentrates on such an angular portion to break the anode can can be reduced.

A method of manufacturing an anode can for a battery according to the present invention includes the steps of preparing a material, forming a cylindrical body, modifying a thickness, and working. In the step of preparing a material, a material member corresponding to a shape of an anode can for a battery to be produced is prepared. In the step of forming a cylindrical body, the material member is deformed so as to obtain a cylindrical body having a sidewall and extending along the central axis. In the step of modifying a thickness, the sidewall is subjected to press working so as to form a large thickness portion located at an end portion of the sidewall and having a relatively large thickness and a small thickness portion being a portion other than the large thickness portion and having a thickness relatively smaller than that of the large thickness portion in the sidewall. In the step of working, the sidewall is subjected to press working such that a distance between an outer circumferential surface of the large thickness portion and the central axis is equal to a distance between an outer circumferential surface of the small thickness portion and the central axis, and a distance between an inner circumferential surface of the large thickness portion and the central axis is smaller than a distance between an inner circumferential surface of the small thickness portion and the central axis.

In this manner, the anode can according to the present invention can readily be manufactured.

The method of manufacturing an anode can for a battery described above may include the step of determining a thickness of the large thickness portion in the sidewall after the step of modifying a thickness and before the step of working. In this case, the large thickness portion in the sidewall can have any thickness.

In the method of manufacturing an anode can for a battery described above, the small thickness portion formed in the step of modifying a thickness may have a thickness equal to that of a small thickness portion of a sidewall of an anode can for a battery to be produced.

In such a case, the final thickness of the small thickness portion of the sidewall is determined in the step of modifying a thickness. Therefore, it is no longer necessary to subject the small thickness portion to press working for modifying the thickness of a portion to serve as the small thickness portion of the sidewall, for example, in a step subsequent to the step of modifying a thickness. That is, solely a portion to be the large thickness portion of the sidewall should be subjected to press forming. Therefore, a possibility that a flaw or the like is caused in the portion to serve as the small thickness portion during press working can be reduced.

In the method of manufacturing an anode can for a battery described above, the step of modifying a thickness may include the step of reducing the thickness of the portion to serve as the small thickness portion by subjecting the portion to serve as the small thickness portion in the sidewall to press forming.

In this case, if the thickness of the portion to serve as the large thickness portion is maintained to a thickness prior to the step of modifying a thickness without being subjected to press forming, the large thickness portion and the small thickness portion can readily be formed.

In the method of manufacturing an anode can for a battery described above, press working may be performed in the step of modifying a thickness such that the distance between the outer circumferential surface of the large thickness portion and the central axis is larger than the distance between the outer circumferential surface of the small thickness portion and the central axis. In addition, the step of working may include the step of subjecting the large thickness portion to press working so as to reduce the distance between the outer circumferential surface of the large thickness portion of the sidewall and the central axis and the distance between the inner circumferential surface of the large thickness portion and the central axis respectively.

In this case, by performing press working so as to move the large thickness portion toward the central axis, the anode can for a battery according to the present invention can readily be obtained from a cylindrical body having a large thickness portion projecting outwardly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
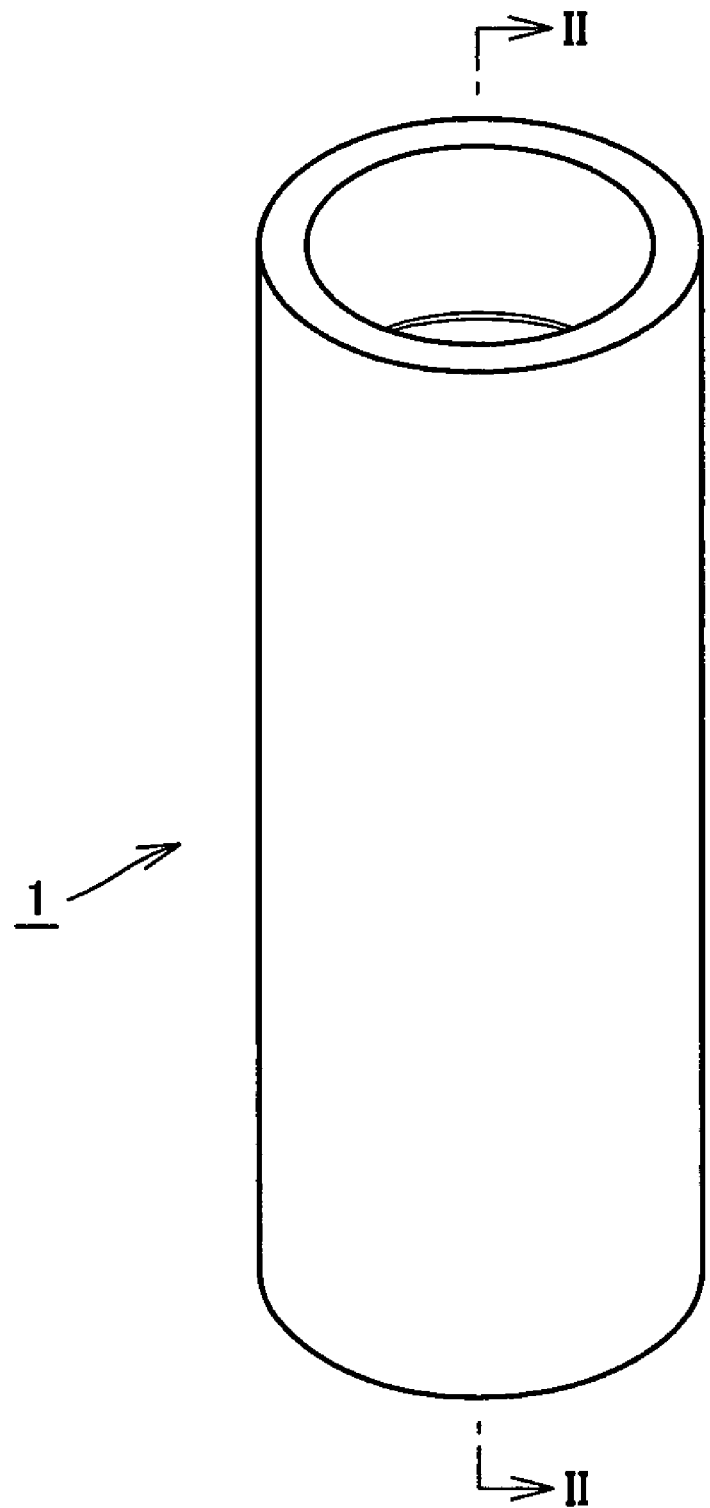
FIG. 1 is a schematic perspective view of an anode can serving as an exterior can member for a battery according to the present invention.

In the following, embodiments of the present invention will be described with reference to the figures. It is noted that the same reference characters refer to the same or corresponding components in the figures, and description thereof will not be repeated.

Referring to FIGS. 1 to 5, an anode can according to the present invention and a battery using the same will be described.

As shown in FIG. 1, an anode can 1 which is an exterior can member of a battery according to the present invention has a cylindrical shape. As can also be seen in FIG. 2, anode can 1 has an opening on the top, and has a bottom wall 4 formed in a portion facing the opening (a portion opposite to the opening). As can also be seen in FIGS. 2 and 3, in the sidewall of anode can 1, a thickness T1 of an upper end portion 2 (see FIG. 3) which is an end portion closer to the opening is larger than a thickness T2 of a sidewall small thickness portion 3 being a portion other than upper end portion 2.

Figure 2:
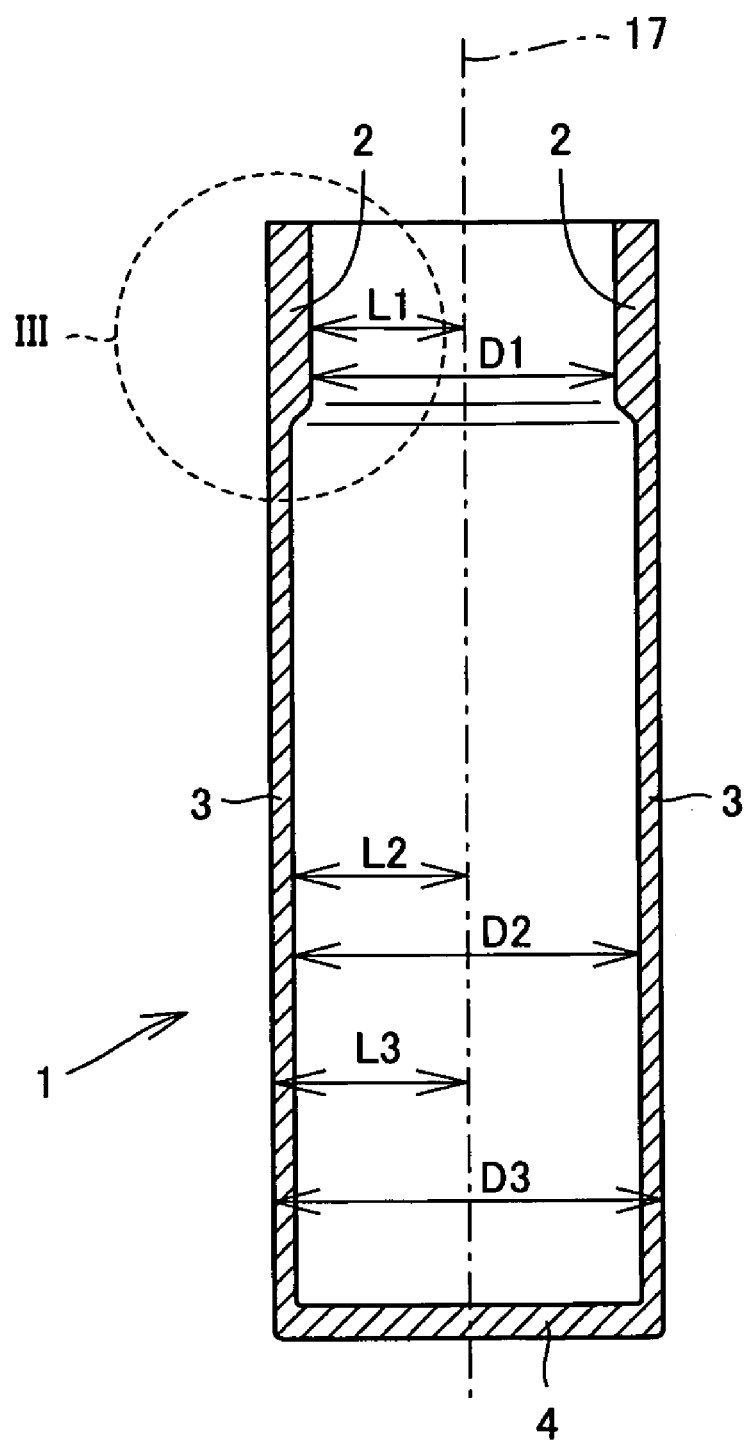
FIG. 2 is a schematic cross-sectional view along the line II-II in FIG. 1.

In addition, outermost surfaces of upper end portion 2 and sidewall small thickness portion 3 are formed such that their cross-sections are located on substantially the same line, as can also be seen in FIG. 2. In other words, in upper end portion 2 serving as the large thickness portion, the sidewall of anode can 1 projects beyond sidewall small thickness portion 3 by ΔT (see FIG. 3) toward the inside of anode can 1.

From a different point of view, a stepped portion 15 is formed at a boundary portion between upper end portion 2 and sidewall small thickness portion 3 on the inner surface of the sidewall of anode can 1. Here, a length L (see FIG. 3) of upper end portion 2 (i.e., the large thickness portion having a thickness T1 larger than thickness T2 of sidewall small thickness portion 3) can be set to any length.

From a further different point of view, as shown in FIG. 2, a distance L3 between the outer circumferential surface of upper end portion 2 of anode can 1 and central axis 17 thereof is equal to a distance L3 between the outer circumferential surface of sidewall small thickness portion 3 and central axis 17. On the other hand, a distance L1 between the inner circumferential surface of upper end portion 2 of anode can 1 and central axis 17 thereof is smaller than a distance between the inner circumferential surface of sidewall small thickness portion 3 and central axis 17. Speaking in terms of an inner diameter or an outer diameter of anode can 1, upper end portion 2 and sidewall small thickness portion 3 have an equal outer diameter D3, whereas an inner diameter D1 of upper end portion 2 is smaller than an inner diameter D2 of sidewall small thickness portion 3.

Summarizing the structure of the anode can for a battery according to the present invention described above, anode can 1 as an anode can for a battery is a cylindrical anode can for a battery having a sidewall and extending along central axis 17 (see FIG. 2). The sidewall has upper end portion 2 serving as the large thickness portion having a relatively large thickness and sidewall small thickness portion 3 serving as the small thickness portion having a thickness relatively smaller than that of upper end portion 2. Upper end portion 2 is located at the end portion of the sidewall, and sidewall small thickness portion 3 refers to a portion other than upper end portion 2 in the sidewall. In the sidewall, the distance between the outer circumferential surface of upper end portion 2 and central axis 17 (half of diameter D3) is equal to the distance between the outer circumferential surface of sidewall small thickness portion 3 and central axis 17 (half of diameter D3). On the other hand, in the sidewall, distance L1 between the inner circumferential surface of upper end portion 2 and central axis 17 is smaller than a distance L2 between the inner circumferential surface of sidewall small thickness portion 3 and central axis 17.

In this manner, the strength of a caulked portion 7 (see FIG. 5) in the battery can be improved as described later.

In addition, in anode can 1 described above, in the sidewall, an inner surface 18 of the boundary portion (stepped portion 15) between upper end portion 2 serving as the large thickness portion and sidewall small thickness portion 3 is inclined toward the inner circumferential surface of the sidewall in sidewall small thickness portion 3. That is, the boundary portion between upper end portion 2 and sidewall small thickness portion 3 has a smooth surface (an angular portion with a sharp angle or the like is not formed). Therefore, when anode can 1 is subjected to working during a manufacturing process of the battery, a possibility that a stress concentrates on the angular portion to break anode can 1 can be reduced.

Figure 4:
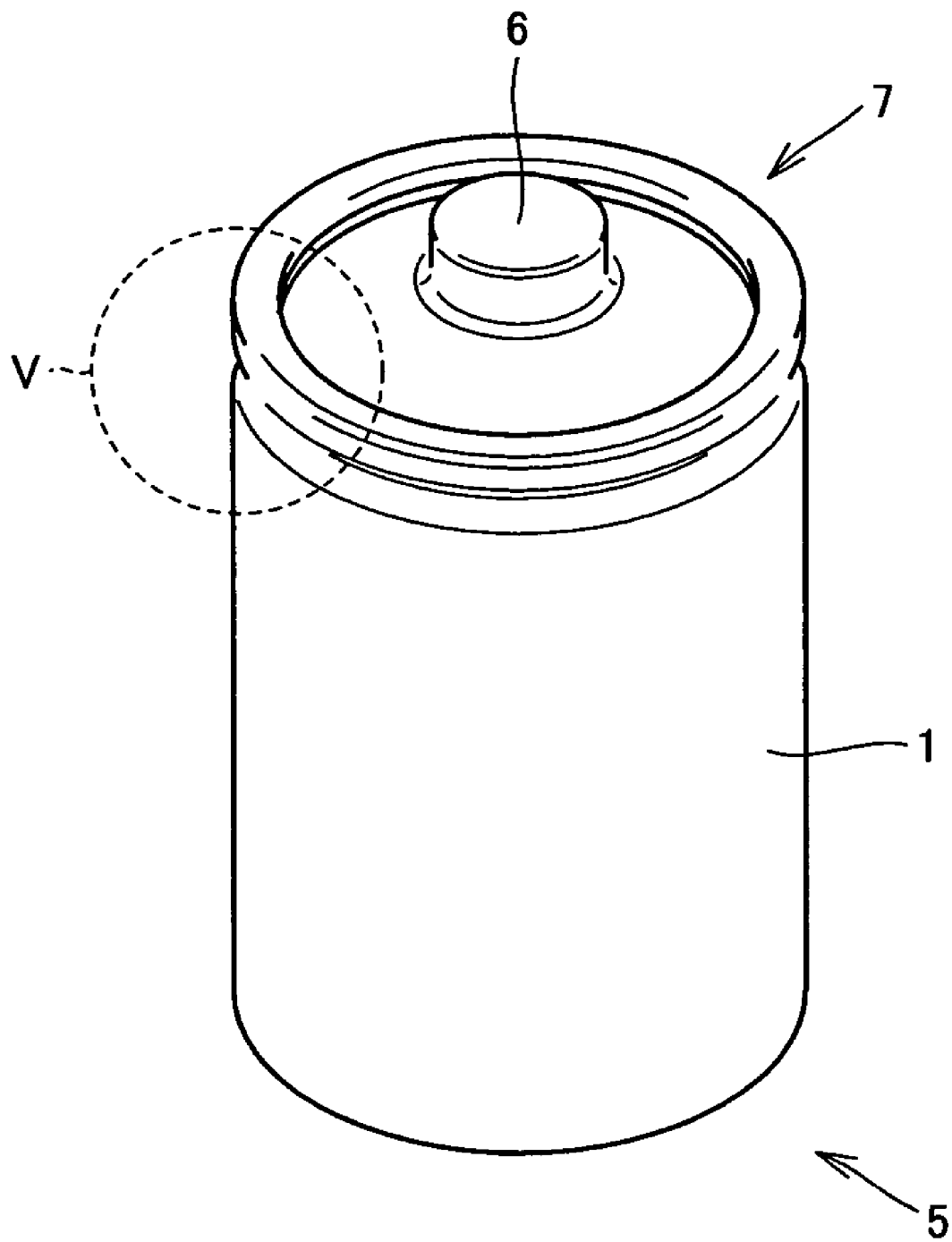
FIG. 4 is a schematic perspective view of a battery manufactured using the anode can shown in FIGS. 1 to 3.
Figure 5:
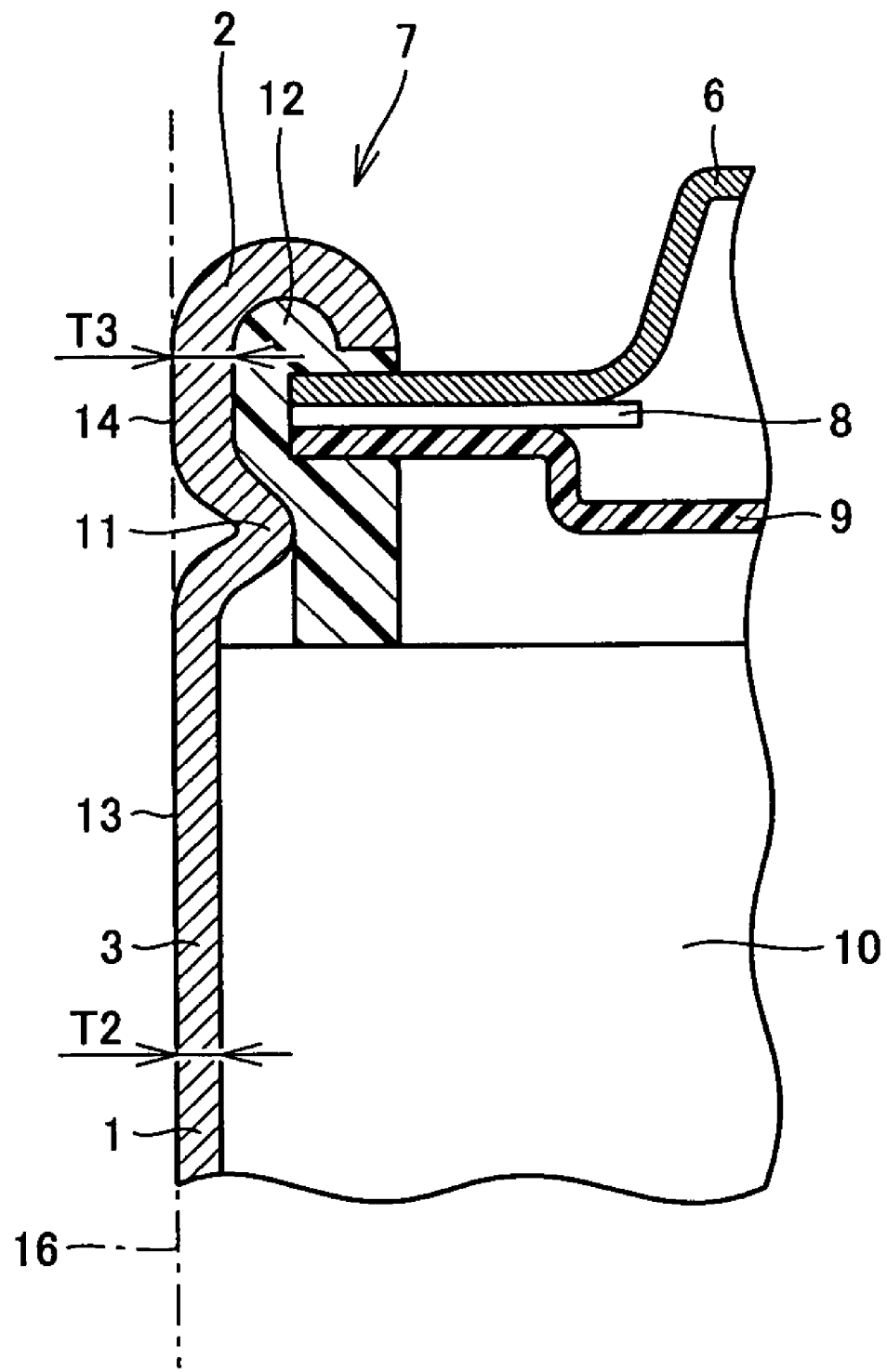
FIG. 5 is a partially enlarged, schematic cross-sectional view showing an area V in FIG. 4.

Referring now to FIGS. 4 and 5, a structure of a battery adopting the anode can shown in FIG. 1 will be described. As shown in FIG. 4, a battery 5 adopting anode can 1 according to the present invention is obtained in the following manner. A battery cell 10 (see FIG. 5) is placed inside anode can 1. Thereafter, a cathode cover 6 is placed in the opening on the top of anode can 1. Cathode cover 6 and anode can 1 are joined to each other in a sealed manner with a use of caulked portion 7, which is formed by caulking with a gasket 12 interposed (see FIG. 5). The structure of caulked portion 7 will be described in detail in connection with FIG. 5.

As shown in FIG. 5, battery cell 10 is placed in anode can 1 in battery 5 (see FIG. 4). In the upper end portion of anode can 1, a concave portion 11 is formed by denting a portion located above the upper surface of battery cell 10 toward the inside of anode can 1. Here, concave portion 11 is formed on the entire circumference of anode can 1.

In the opening of anode can 1, a safety valve 9 is placed in an area above the upper surface of battery cell 10 so as to cover the opening of anode can 1. On safety valve 9, a PTC 8 (Positive Temperature Coefficient) is placed. Further, cathode cover 6 made of a conductor is placed on PTC 8. Cathode cover 6 is electrically connected to a cathode terminal (not shown) of battery cell 10. Cathode cover 6, PTC 8 and safety valve 9 are fixed, grasped by gasket 12 made of an insulator such as a resin. Gasket 12 is grasped and fixed by the upper end portion of anode can 1 by bending an end of upper end portion 2 (see FIG. 2) of anode can 1 toward the inside of anode can 1, as shown in FIG. 5. Moreover, by bending the upper end portion of anode can 1 in caulked portion 7, a position of gasket 12 is fixed, and cathode cover 6, PTC 8 and safety valve 9 are grasped by gasket 12. It is noted that anode can 1 according to the present invention can be adapted to any battery such as a lithium ion battery, a manganese dioxide battery, a nicad (Ni—Cd) battery, a nickel metal hydride battery, or the like.

Figure 3:
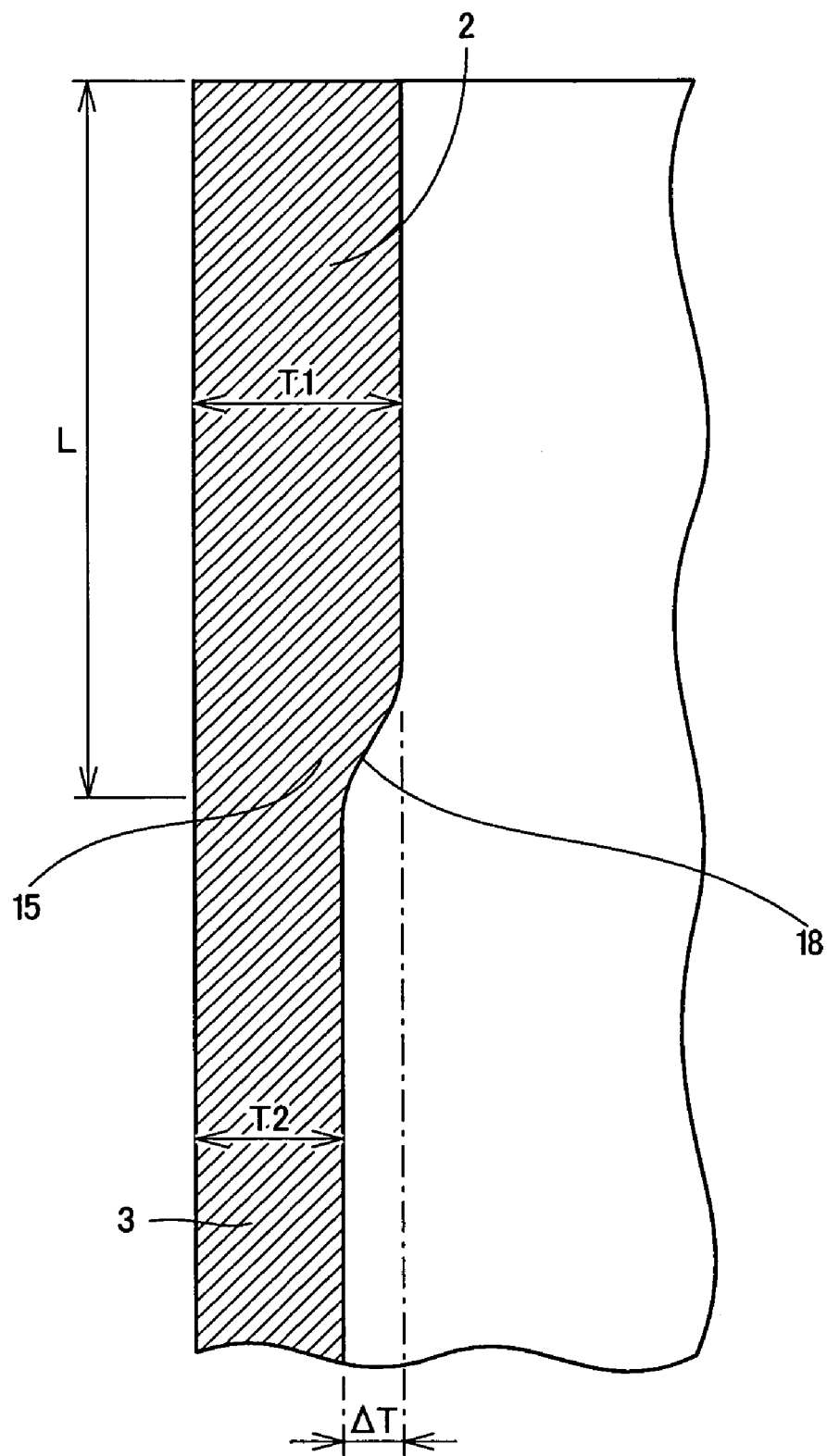
FIG. 3 is a partially enlarged, schematic cross-sectional view showing an area III in FIG. 2.

As shown in FIG. 3, thickness T1 of upper end portion 2 is larger than thickness T2 of sidewall small thickness portion 3. Therefore, even after upper end portion 2 is bent toward the inside of anode can 1 in order to form caulked portion 7 as shown in FIG. 5, thickness T3 of upper end portion 2 is larger than thickness T2 of sidewall small thickness portion 3 of anode can 1.

In this manner, thickness T3 of upper end portion 2 in the sidewall of anode can 1 forming caulked portion 7 is larger than thickness T2 of sidewall small thickness portion 3, which is a portion other than upper end portion 2. Therefore, even after upper end portion 2 is bent in caulked portion 7, the strength of caulked portion 7 can be maintained sufficiently high.

In addition, as shown in FIG. 2, the outermost surfaces of upper end portion 2 and sidewall small thickness portion 3 in the sidewall of anode can 1 are located on the same surface extending along a direction in which central axis 17 extends. Accordingly, as shown in FIGS. 4 and 5, even after caulked portion 7 is formed in order to implement battery 5, an anode can surface 14 serving as an outermost surface of upper end portion 2 forming caulked portion 7 and an anode can surface 13 serving as an outermost surface of sidewall small thickness portion 3 are located on the same surface extending along the central axis. In other words, as shown in FIG. 5, in the cross-sectional shape of battery 5 (see FIG. 4), anode can surface 14 of upper end portion 2 and anode can surface 13 of sidewall small thickness portion 3 coincide with one segment 16.

In this manner, when caulked portion 7 is formed, it is possible to avoid that the distance from anode can surface 14 of upper end portion 2 in the sidewall of anode can 1 forming caulked portion 7 to central axis 17 (see FIG. 2) is larger than the distance from anode can surface 13 serving as the outermost surface of sidewall small thickness portion 3 forming a wall for a portion accommodating battery cell 10 to central axis 17 (see FIG. 2) (namely, the outer diameter of caulked portion 7 larger than that of the portion accommodating battery cell 10 can be avoided). Accordingly, it is not necessary to make the maximum outer diameter of sidewall small thickness portion 3 of anode can 1 accommodating battery cell 10 smaller than the maximum outer diameter in accordance with the battery specifications, in order to set a largest outer diameter in caulked portion 7 (largest outer diameter portion) to be within the maximum outer diameter in accordance with the battery specifications. As such, the outer diameter of sidewall small thickness portion 3 can be made as large as the maximum outer diameter in accordance with the specifications, and accordingly, the volume of the portion accommodating battery cell 10 can be made as large as a volume defined in the specifications. Therefore, the capacity of battery 5 (see FIG. 4) can be increased.

An effect of the anode can according to the present invention described above will be discussed more specifically, in comparison with a battery using an anode can in a comparative example shown in FIGS. 6 and 7. Here, FIG. 6 corresponds to FIG. 2, and FIG. 7 corresponds to FIG. 5.

Figure 6:
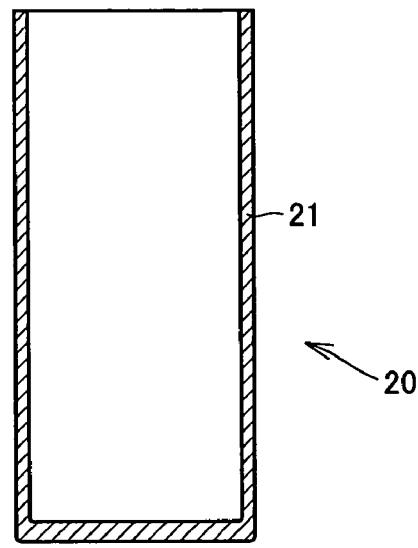
FIG. 6 is a schematic cross-sectional view showing an anode can as a comparative example of the present invention.
Figure 7:
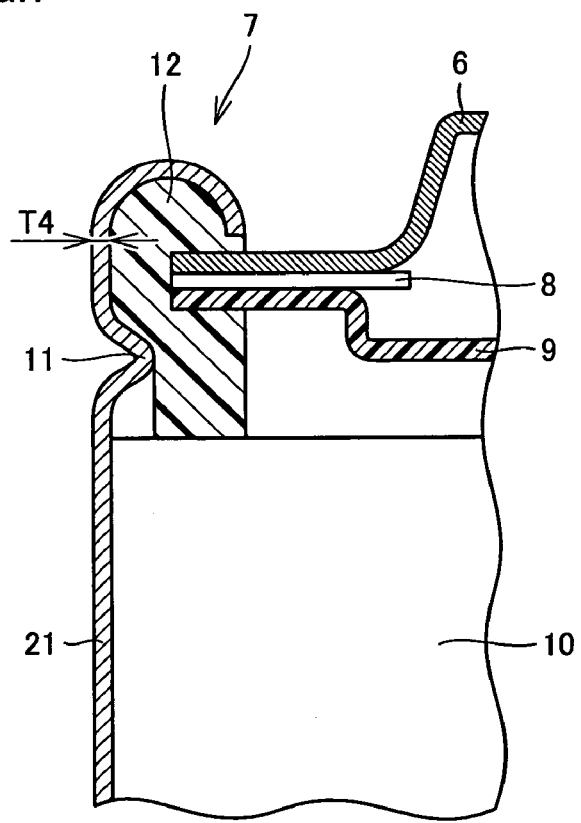
FIG. 7 is a partially enlarged, schematic cross-sectional view showing a caulked portion in a battery manufactured using the anode can shown in FIG. 6.

As shown in FIGS. 6 and 7, if an anode can 20 with a sidewall 21 having substantially the same thickness in its entirety is employed as an anode can, a thickness T4 of the sidewall forming caulked portion 7 is substantially equal to the thickness of sidewall 21 of anode can 20 (see FIG. 6) accommodating battery cell 10, as shown in FIG. 7. Here, the thickness of sidewall 21 of anode can 20 is desirably made as small as possible, in order to maximize the capacity of battery cell 10 within a range of the battery specifications. Therefore, the thickness of sidewall 21 is set as small as possible, while maintaining a strength sufficient to hold battery cell 10.

In caulked portion 7, however, a sufficient strength is required in a portion of sidewall 21 of anode can 20 (see FIG. 6) forming caulked portion 7, in order to hold gasket 12 as well as cathode cover 6, PTC 8 and safety valve 9 with gasket 12 interposed. On the other hand, the thickness of sidewall 21 is set as small as possible as described above. Accordingly, if anode can 20 shown in FIGS. 6 and 7 is employed, it is difficult for caulked portion 7 to have a sufficiently high strength. Meanwhile, in caulked portion 7 in the battery employing the anode can according to the present invention shown in FIG. 5, thickness T3 in upper end portion 2 is larger than thickness T2 of sidewall small thickness portion 3. Therefore, caulked portion 7 can attain a strength sufficiently higher than in the example shown in FIG. 7.

Figure 8:
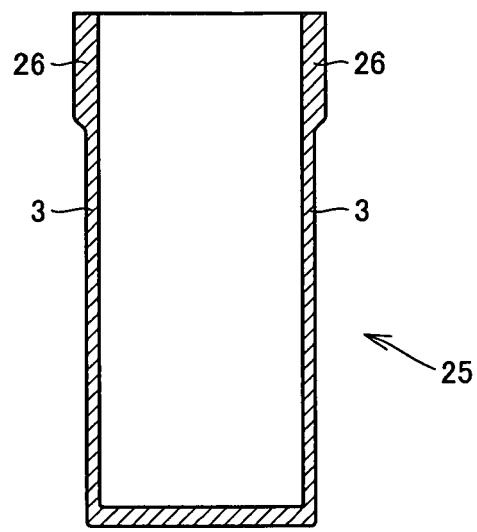
FIG. 8 is a schematic cross-sectional view showing an anode can as a second comparative example of the present invention.
Figure 9:
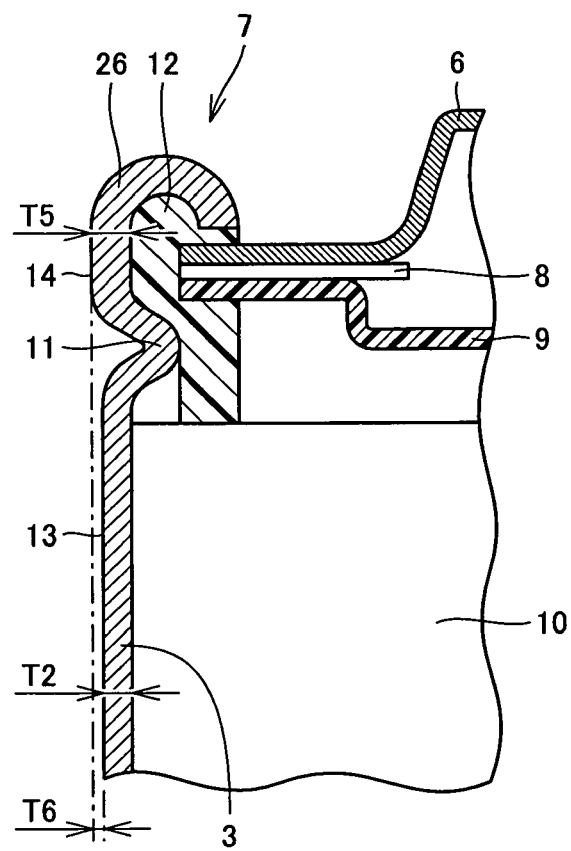
FIG. 9 is a partially enlarged, schematic cross-sectional view showing a caulked portion in a battery manufactured using the anode can shown in FIG. 8.

In addition, the anode can according to the present invention shown in FIGS. 1 to 5 has an effect to increase the capacity of the battery as described already, as compared with an anode can 25 in a second comparative example shown in FIGS. 8 and 9. The effect will be described in the following. Here, FIG. 8 corresponds to FIG. 2, and FIG. 9 corresponds to FIG. 5.

As can also be seen in FIG. 8, in anode can 25 in the second comparative example, the sidewall is formed by an upper end portion 26 having a relatively large thickness and sidewall small thickness portion 3 having a relatively small thickness. On the other hand, in anode can 25 shown in FIG. 8, the outer circumferential surface of upper end portion 26 projects toward the outer circumferential side of anode can 25 beyond the outer circumferential surface of sidewall small thickness portion 3. Meanwhile, the inner surface of the sidewall of anode can 25 is fabricated such that the inner circumferential surfaces of upper end portion 26 and sidewall small thickness portion 3 are located on substantially the same surface.

When a battery as shown in FIG. 4 is manufactured using the anode can as shown in FIG. 8, a thickness T5 of upper end portion 26 is larger than thickness T2 of sidewall small thickness portion 3 in caulked portion 7, as shown in FIG. 9. Accordingly, the strength of caulked portion 7 can be enhanced, as compared with the example using the anode can shown in FIGS. 6 and 7. As can also be seen in FIG. 8, however, the outer circumferential surface of upper end portion 26 projects outwardly from anode can 25. Therefore, even after caulked portion 7 is formed, anode can surface 14 serving as the outermost surface of upper end portion 26 projects by a length T6 toward the outer circumferential side of anode can 25 beyond anode can surface 13 serving as the outermost surface of sidewall small thickness portion 3 of anode can 25. In other words, a distance from the central axis of the battery to anode can surface 14 in caulked portion 7 is longer by length T6 than a distance from anode can surface 13 serving as the outermost surface of sidewall small thickness portion 3 to the central axis of the battery.

As described already, the battery specifications are determined, depending on its maximum outer diameter. As such, when the maximum outer diameter of the battery is determined by a position of anode can surface 14 of caulked portion 7, in order to adapt to the specifications, the distance between anode can surface 13 of sidewall small thickness portion 3 serving as the sidewall of a portion accommodating battery cell 10 and the central axis of the battery should be made smaller by length T6. As a result, the battery shown in FIG. 9 has a volume of battery cell 10 smaller than in the battery using the anode can according to the present invention shown in FIG. 5.

On the other hand, in the battery using the anode can according to the present invention shown in FIG. 5, the distance between anode can surface 13 of sidewall small thickness portion 3 and the central axis of the battery can be made as large as the maximum outer diameter in accordance with the battery specifications, in contrast to the battery using the anode can in the comparative example shown in FIG. 9. Therefore, the volume of battery cell 10 can be increased, and consequently, the capacity of the battery can be made larger.

Referring to FIGS. 10 to 14, a method of manufacturing the anode can shown in FIGS. 1 to 3 will now be described.

Figure 10:
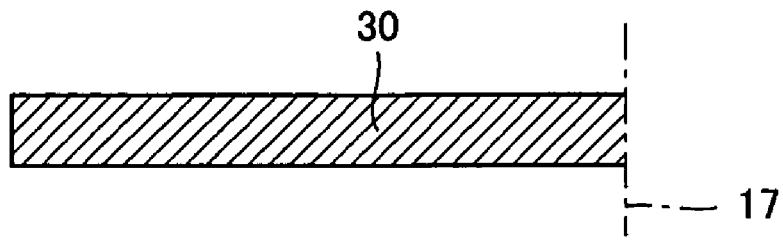
FIGS. 10 to 14 are schematic cross-sectional views illustrating first to fifth steps in a method of manufacturing the anode can shown in FIGS. 1 to 3.

Initially, as shown in FIG. 10, in the step of preparing a material member corresponding to the shape of the anode can for a battery to be produced, a plate material 30 used as a material for the anode can is prepared. Plate material 30 is a material member corresponding to the shape of the anode can for a battery to be produced, and has a circular shape when viewed two-dimensionally. FIGS. 10 to 14 show only a portion on the left-hand side of central axis 17, because plate material 30 and the anode can to be formed have a symmetrical shape around central axis 17.

Figure 11:
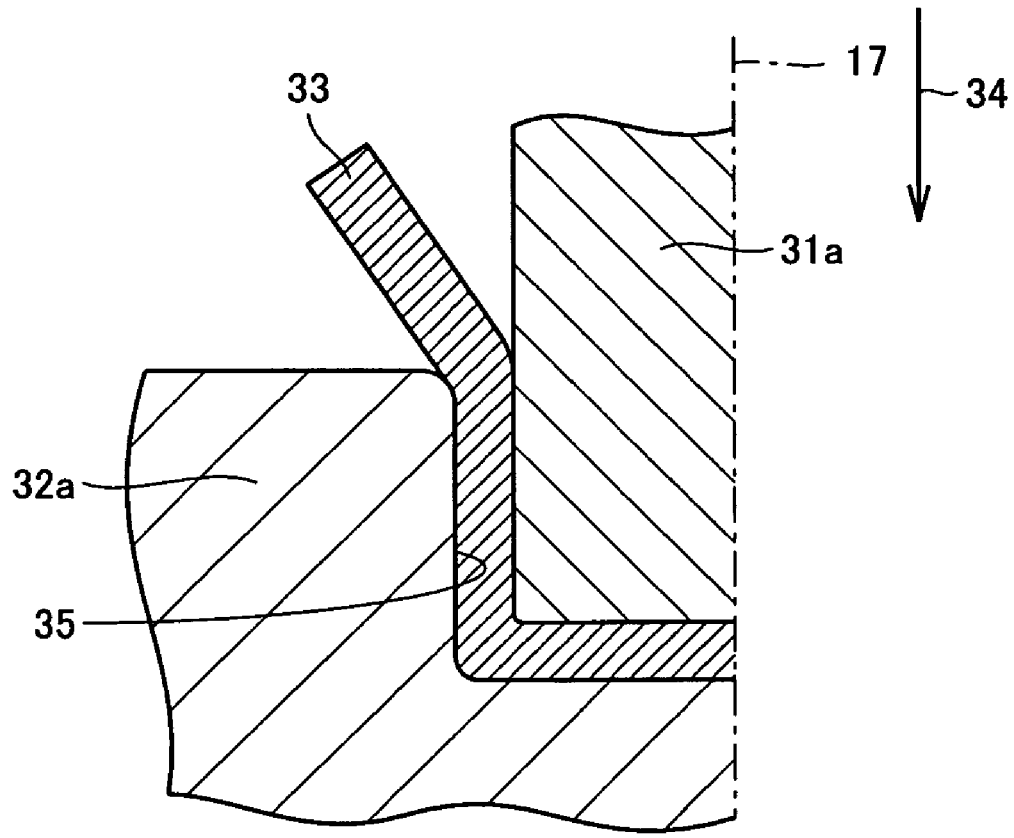

As shown in FIG. 11, the plate material (see FIG. 10) is placed between a die 32a having a cup-shaped concave portion 35 formed and a punch 31a. Thereafter, punch 31a is moved relative to die 32a in a direction shown with an arrow 34. In this manner, the pressing step in which plate material 30 (see FIG. 10) is plastically deformed so as to be in a shape in accordance with the shape of an inner surface of concave portion 35 of die 32a is performed. As a result, plate material 30 (see FIG. 10) is plastically deformed to provide a cup-shaped material 33 (see FIG. 1). Thereafter, punch 31a is moved relative to die 32a in a direction opposite to the direction shown with arrow 34. Then, cup-shaped material 33 is taken out from concave portion 35 of die 32a. In this manner, the step of forming a cylindrical body, in which the material member (plate material 30 (see FIG. 10)) is deformed such that a cylindrical body (cup-shaped material 33) having a sidewall and extending along central axis 17 is obtained, is performed.

Thereafter, using another die having a different depth of concave portion 35 and another punch corresponding to that die, the pressing step similar to the step shown in FIG. 11 is performed for a plurality of times so as to increase the depth of cup-shaped material 33.

Figure 12:
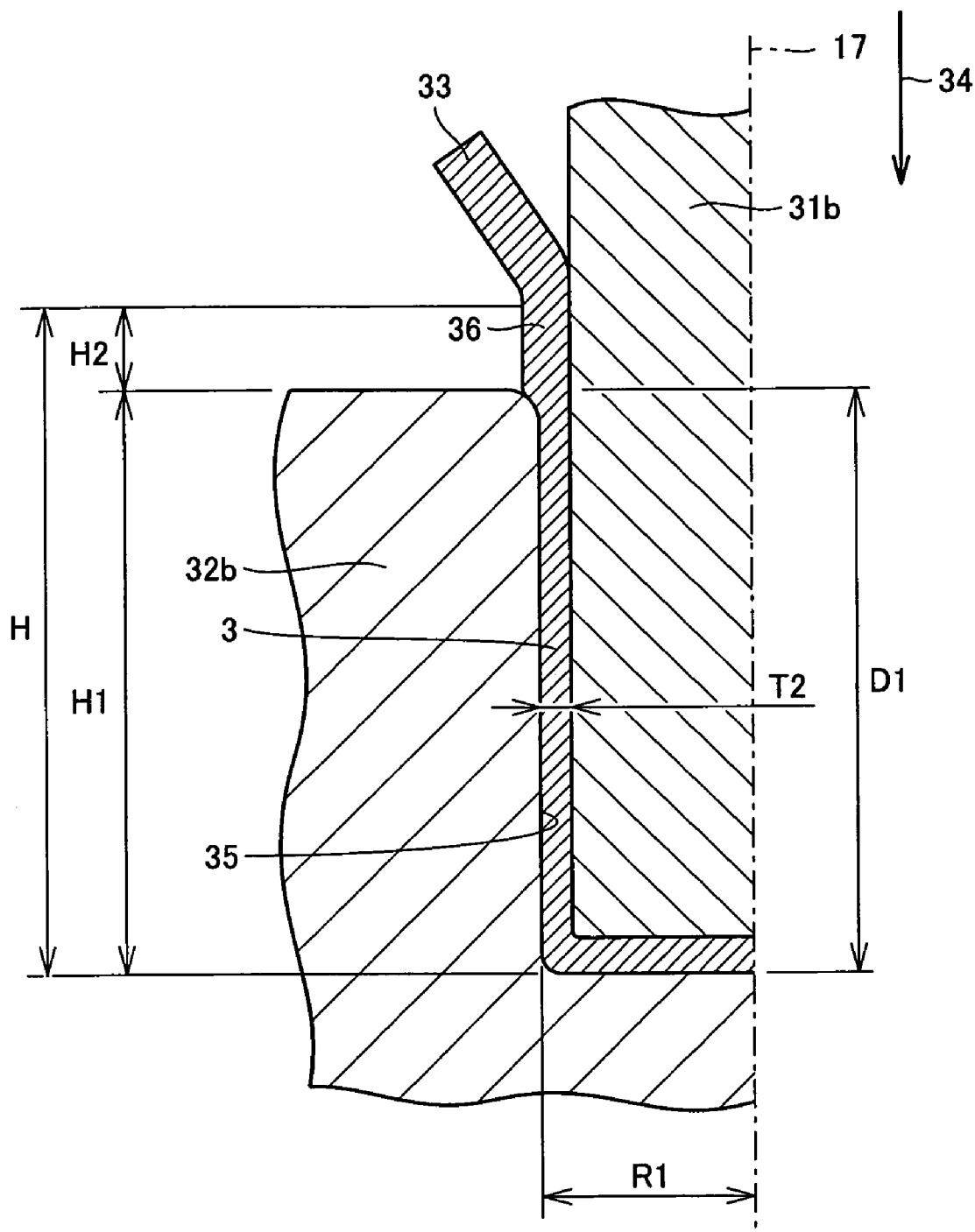

Then, as shown in FIG. 12, cup-shaped material 33 is placed between a die 32b having concave portion 35 of a depth D1 formed and a punch 31b having such a length as to reach the bottom wall of concave portion 35 and such a size as to allow insertion into concave portion 35. Then, the step of press working is performed, in which punch 31b is moved relative to die 32b in a direction shown with arrow 34 to plastically deform cup-shaped material 33 so that cup-shaped material 33 is in a shape in accordance with the inner surface of concave portion 35.

Here, the shape of concave portion 35 is determined such that depth D1 of concave portion 35 is substantially equal to length H1 of sidewall small thickness portion 3 of anode can 1 (see FIG. 1) to be formed. In other words, the step of reducing the thickness of a portion to serve as sidewall small thickness portion 3 is performed by subjecting the portion to serve as sidewall small thickness portion 3 in the sidewall of cup-shaped material 33 to press forming. As shown in FIG. 12, in the step of press working described above, the press working is performed such that the distance between the outer circumferential surface of large thickness portion 36 and central axis 17 is larger than the distance between the outer circumferential surface of sidewall small thickness portion 3 and central axis 17. As a result, a large thickness portion 36 having a thickness larger than sidewall small thickness portion 3 and having a length H2 is formed in the upper portion of cup-shaped material 33. Here, the total length H of length H1 of sidewall small thickness portion 3 and length H2 of large thickness portion 36 is equal to the length (height) of the anode can for a battery to be produced.

As a result, sidewall small thickness portion 3 having thickness T2 and large thickness portion 36 having a thickness larger than that of sidewall small thickness portion 3 are formed in the sidewall of cup-shaped material 33.

Here, thickness T2 of sidewall small thickness portion 3 to be formed is equal to thickness T2 of sidewall small thickness portion 3 (see FIG. 3) in the sidewall of the anode can for a battery to be produced. In this manner, it is not necessary to subject sidewall small thickness portion 3 to press working using a die or a punch in a subsequent step. Therefore, a possibility that a flaw or the like is caused in sidewall small thickness portion 3 in the subsequent step can be reduced.

Thereafter, punch 31b is removed from concave portion 35 by relatively moving punch 31b in a direction opposite to the direction shown with arrow 34. Then, cup-shaped material 33 is taken out from concave portion 35. In this manner, the step of modifying the thickness is performed, in which the sidewall of cup-shaped material 33 is subjected to press working, so as to form large thickness portion 36 located at the end portion of the sidewall and having a relatively large thickness and sidewall small thickness portion 3 being a portion other than large thickness portion 36 and having a thickness relatively smaller than that of large thickness portion 36.

Figure 13:
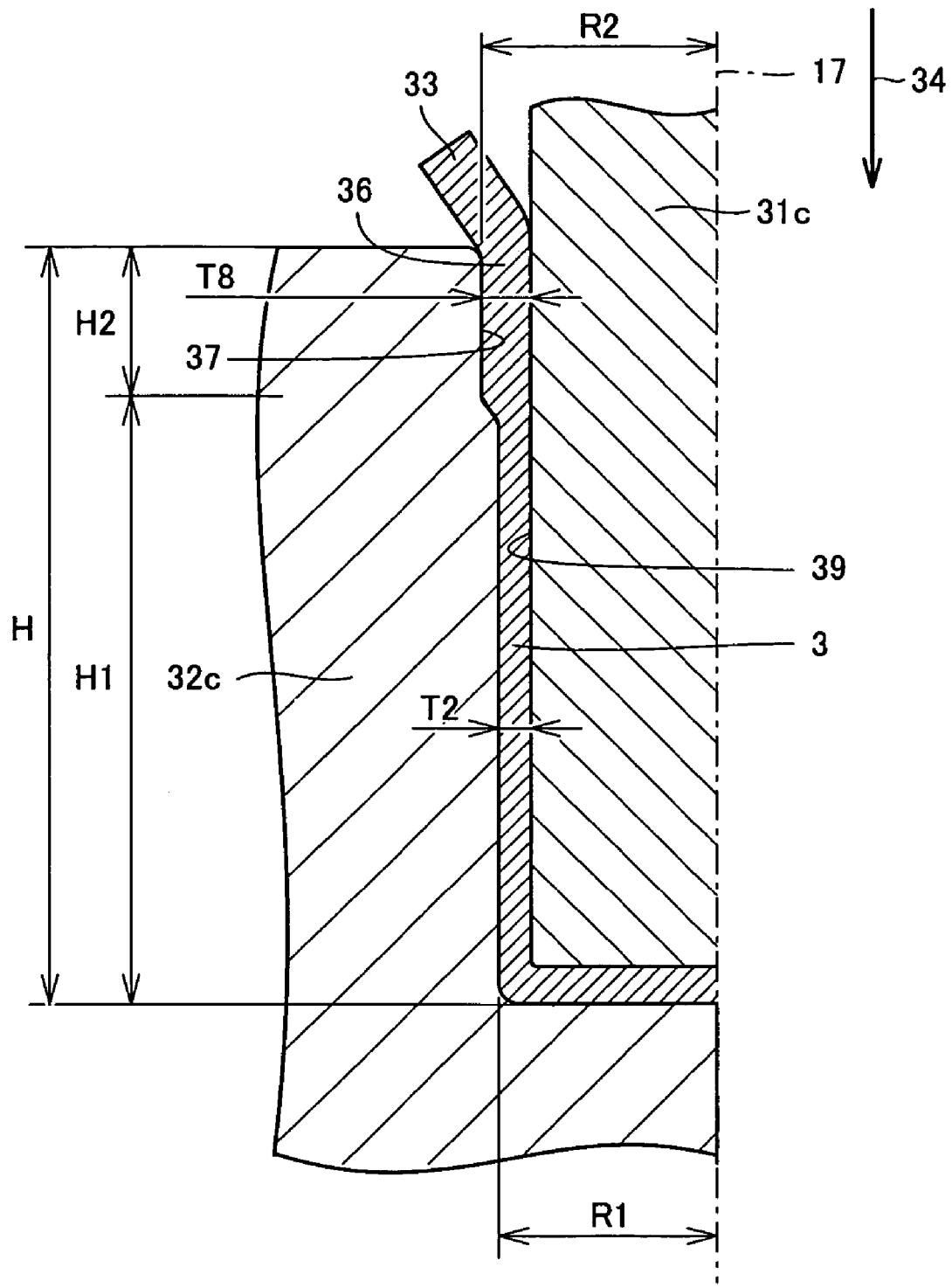

Then, as shown in FIG. 13, the step of determining the thickness of large thickness portion 36 is performed. Specifically, cup-shaped material 33 is placed between a die 32c having an opening formed and a punch 31c. In the opening of die 32c, when press forming is performed as shown in FIG. 13, a distance between an inner circumferential surface facing sidewall small thickness portion 3 of cup-shaped material 33 and central axis 17 is set to a distance R1. In addition, in the opening of die 32c, when press forming is performed as shown in FIG. 13, a distance between an inner circumferential surface (a die surface 37) facing large thickness portion 36 of cup-shaped material 33 and central axis 17 is set to a distance R2. Here, distance R2 is larger than distance R1. Moreover, in the opening of die 32c, the inner circumferential surface facing sidewall small thickness portion 3 and the inner circumferential surface facing large thickness portion 36 are both circumferential surfaces around central axis 17. Further, in the opening of die 32c, a surface shape of a junction between the inner circumferential surface facing sidewall small thickness portion 3 and the inner circumferential surface facing large thickness portion 36 is tapered such that the distance from the outer circumferential surface of the junction between sidewall small thickness portion 3 and large thickness portion 36 to central axis 17 is smoothly varied.

Then, punch 31c is moved relative to die 32c in a direction shown with arrow 34. In this manner, large thickness portion 36 is plastically deformed by being pressed between the inner circumferential surface of the opening of die 32c and a surface 39 of punch 31c. A thickness T8 of large thickness portion 36 can thus be determined to any thickness. Specifically, thickness T8 of large thickness portion 36 may be determined to attain a thickness of upper end portion 2 (see FIG. 2) serving as the large thickness portion of the anode can for a battery to be produced.

Thereafter, punch 31c is moved relative to die 32c in a direction opposite to the direction shown with arrow 34, so as to remove punch 31c from the opening of die 32c. Then, cup-shaped material 33 is removed from the opening of die 32c. In this manner, the step of determining the thickness of large thickness portion 36 in the sidewall of cup-shaped material 33 is performed.

Figure 14:
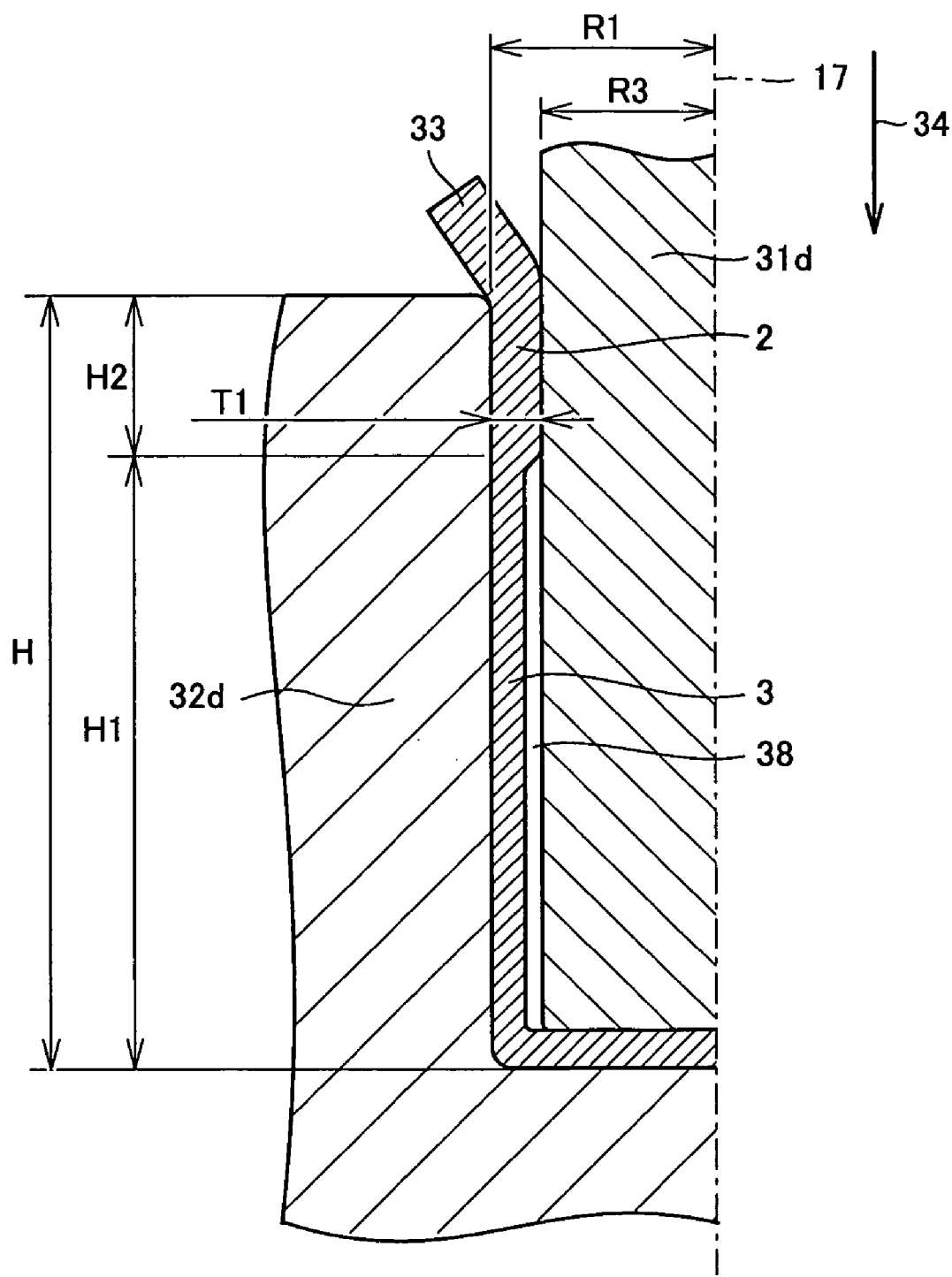

Then, the step of forming upper end portion 2 by projecting the large thickness portion toward the inside of the anode can is performed. Specifically, as shown in FIG. 14, cup-shaped material 33 is placed between a punch 31d and a die 32d having a cylindrical opening formed. Here, the opening has a radius equal to distance R1 from central axis 17. Then, punch 31d is moved relative to die 32d in a direction shown with arrow 34. In this manner, upper end portion 2 of cup-shaped material 33 is plastically deformed such that an outer circumferential surface of upper end portion 2 of cup-shaped material 33 and the outer circumferential surface of sidewall small thickness portion 3 are located on substantially the same surface, and the inner circumferential surface of upper end portion 2 projects toward the inside of cup-shaped material 33.

In this manner, the step of working is performed, in which the sidewall of cup-shaped material 33 is subjected to press working such that distance R1 between the outer circumferential surface of upper end portion 2 and central axis 17 is equal to the distance between the outer circumferential surface of sidewall small thickness portion 3 and central axis 17, whereas distance R3 between the inner circumferential surface of upper end portion 2 and central axis 17 is smaller than the distance between the inner circumferential surface of sidewall small thickness portion 3 and central axis 17. In the step of working shown in FIG. 14, upper end portion 2 is subjected to press working such that distance R1 between the outer circumferential surface of upper end portion 2 serving as the large thickness portion of the sidewall of cup-shaped material 33 and central axis 17 and distance R3 between the inner circumferential surface of upper end portion 2 serving as the large thickness portion and central axis 17 are both made smaller.

Here, an outer diameter of punch 31d is determined such that thickness T1 of upper end portion 2 attains thickness T1 of upper end portion 2 of the anode can shown in FIG. 1. In addition, as can be seen in FIG. 14, a gap 38 is formed between the inner circumferential surface of sidewall small thickness portion 3 and the outer circumferential surface of punch 31d. Here, the outer circumferential surface of a portion facing sidewall small thickness portion 3 on the tip end side of punch 31d may be displaced toward central axis 17 from the outer circumferential surface of a portion of punch 31d facing upper end portion 2 (so as to decrease the outer diameter (or width)). In this manner, when punch 31d is moved relative to die 32d in a direction opposite to the direction shown with arrow 34, punch 31d is readily removed from the opening of die 32d.

In this manner, with cup-shaped material 33 to serve as the anode can for a battery, sidewall small thickness portion 3 having height H1 above the outer circumferential surface of the bottom wall and upper end portion 2 positioned above sidewall small thickness portion 3 and having a relatively large thickness T1 and length H2 can be formed.

Thereafter, an unnecessary portion located above upper end portion 2 of cup-shaped material 33 is cut and removed (a portion located higher than height H above the bottom wall outer circumferential surface of material 33 is removed by cutting the sidewall of cup-shaped material 33 at height H above the bottom wall outer circumferential surface of cup-shaped material 33, the height H being a height of anode can 1 to be produced). Anode can 1 as shown in FIG. 1 can thus be obtained. In other words, the obtained anode can has height H shown in FIG. 14.

As can be seen from FIGS. 12 to 14, the distance from the inner circumferential surface of the opening (concave portion 35) formed in die 32b shown in FIG. 12 to central axis 17, the distance from the inner circumferential surface of the portion facing sidewall small thickness portion 3 of material 33 in the wall surface of the opening formed in die 32c shown in FIG. 13 to central axis 17, and the distance from the inner circumferential surface of the opening formed in die 32d shown in FIG. 14 to central axis 17 are equal to distance R1 (the distance between the outer circumferential surface of the anode can to be produced and central axis 17) respectively.

Though the above-described embodiment has illustrated the present invention using the anode can for a battery, the present invention is applicable to a cathode can for a battery. In other words, the cathode can for a battery can have a structure as shown in FIGS. 1 to 3. The present invention is applicable to a can member for a battery including the anode can and the cathode can for a battery.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an anode can for a battery, the method comprising:

preparing a material member corresponding to a shape of an anode can for a battery to be produced;

forming a cylindrical body by deforming said material member so as to obtain a cylindrical body extending along a central axis and having a sidewall;

modifying a thickness by subjecting said sidewall to press working so as to form a large thickness portion located at an end portion of said sidewall and having a relatively large thickness and a small thickness portion being a portion other than said large thickness portion and having a thickness relatively smaller than that of said large thickness portion in said sidewall, the large thickness portion has an outer circumferential surface and an inner circumferential surface, the small thickness portion has an outer circumferential surface and an inner circumferential surface, a distance between the outer circumferential surface of the large thickness portion and the central axis is greater than a distance between the outer circumferential surface of the small thickness portion and the central axis, and a distance between the inner circumferential surface of the large thickness portion and the central axis is equal to a distance between the inner circumferential surface of the small thickness portion and the central axis; and displacing the outer circumferential surface of the large thickness portion by arranging the cylindrical body having said large thickness portion and said small thickness portion formed in said step of modifying a thickness, between a die having a cylindrical opening and a cylindrical punch inserted in the cylindrical body, subjecting said sidewall to press working so that the distance between the outer circumferential surface of said large thickness portion and said central axis is equal to the distance between the outer circumferential surface of said small thickness portion and said central axis, and the distance between the inner circumferential surface of said large thickness portion and said central axis is smaller than the distance between the inner circumferential surface of said small thickness portion and said central axis, wherein a diameter of the punch is set to such a value that the punch comes in contact with the inner circumferential surface of the worked large thickness portion but not in contact with the inner circumferential surface of the worked small thickness portion.

2. The method of manufacturing an anode can for a battery according to claim 1, further comprising:

determining a thickness of said large thickness portion in said sidewall after modifying a thickness and before displacing the outer circumferential surface of the large thickness portion.

3. The method of manufacturing an anode can for a battery according to claim 1, wherein said small thickness portion formed in said step of modifying a thickness has a thickness equal to that of a small thickness portion in a sidewall of an anode can for a battery to be produced.

4. The method of manufacturing an anode can for a battery according to claim 1, wherein said step of press working includes:

inserting said punch into said opening together with said cylindrical body, a distance between an inner circumferential surface of said opening of said die and said central axis is equal to a distance between an outer circumferential surface of the anode can to be produced and said central axis, and a distance between an outer circumferential surface of said punch and said central axis is equal to a distance between the inner circumferential surface of said large thickness portion and said central axis.

\* \* \* \* \*